(No Model.)
G. T. JOBSON.
CAR STARTER.
No. 364,939. Patented June 14, 1887.
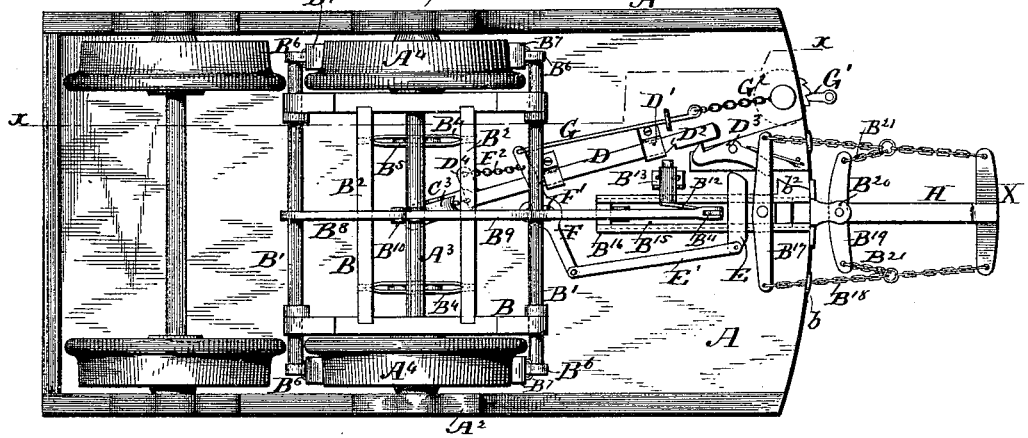
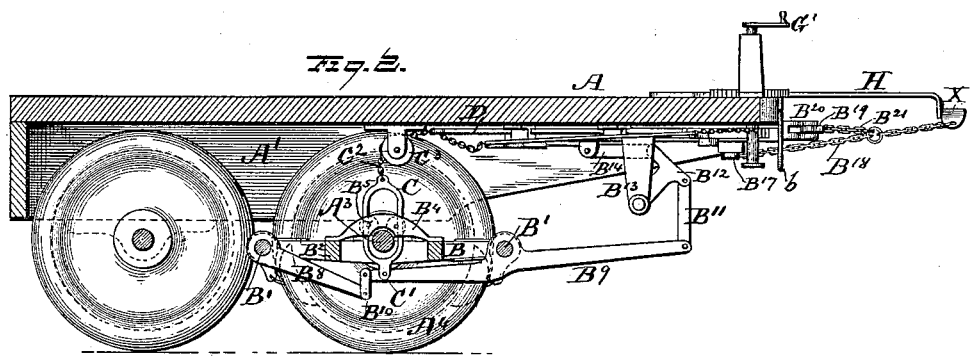
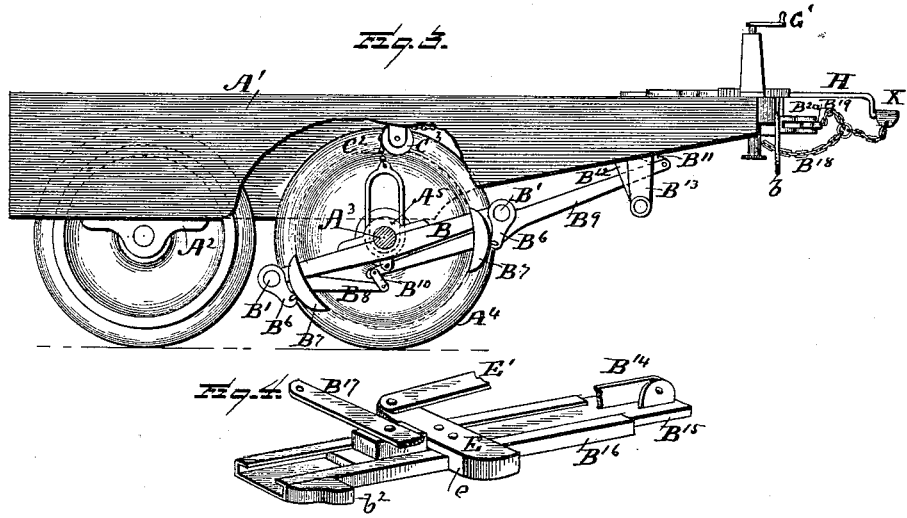
Witnesses:
E. C. Sturdeman
J. J. Masson
Inventor:
Giles T. Jobson
by E. E. Masson
atty.

UNITED STATES PATENT OFFICE.

GILES T. JOBSON, OF AUGUSTA, GEORGIA.

CAR-STARTER.

SPECIFICATION forming part of Letters Patent No. 364,939, dated June 14, 1887.

Application filed March 2, 1887. Serial No. 229,440. (No model.)

*To all whom it may concern:*

Be it known that I, GILES T. JOBSON, a citizen of the United States, residing at Augusta, in the county of Richmond, State of Georgia, have invented certain new and useful Improvements in Car-Starters, of which the following is a specification, reference being had therein to the accompanying drawings.

The objects of this invention are to provide a combined brake and starter for cars, and to so construct the same that the brakes themselves, bearing against two points of the tire of the wheels, will act to give impetus to the wheels at the time the horse is started.

With these general objects in view the invention consists in certain features of construction, hereinafter described, and particularly pointed out in the claims.

Referring to the drawings, Figure 1 is a bottom plan view of a portion of a car provided with a brake and starter constructed in accordance with my invention. Fig. 2 is a longitudinal vertical section of the same on line $x\ x$ of Fig. 1, showing the wheels released from the brake. Fig. 3 is a side elevation of the same, partly broken away, showing the brake-shoes clamping one of the traction-wheels. Fig. 4 is a perspective view of the draft sliding bar, its connections, and guideway.

Like letters indicate like parts in all the figures.

A represents the bottom of a car, and A' the sides thereof, which are provided with suitable car-axle boxes, $A^2$, for the axle $A^3$, and wheels $A^4$. Journaled upon the axle $A^3$ is a rocking brake-frame, B, pivotally supporting at each end rock-shafts B', and having intermediate tie-bars, $B^2$. At each side of the frame, and extending from one tie-bar to the other, are sheave-plates $B^4$, each of which carries a pair of frictional rollers, $B^5$, one of which bears on each side of the axle $A^3$, thus, although said axle passes through boxes $A^5$, secured to the brake-frame, all wear thereof by the rotation of the axle is obviated by said frictional rollers, as they assume the weight of the frame. At each end of the rock-shafts B' are brake-arms $B^6$, to which are pivoted the usual form of brake-shoe, $B^7$, adapted to bear against two opposite points of the periphery of the wheels. Extending from the middle of each of the rock-shafts B' to a point beneath the axle are rock-arms $B^8\ B^9$, that are connected at their inner ends by a pivoted shackle, $B^{10}$.

Pivoted to the outer or front end of the rock-arm $B^9$ that extends in front of the forward rock-shaft is an arm or link, $B^{11}$, which connects said rock-arm to a T-shaped bell-crank lever, $B^{12}$, pivotally mounted in brackets $B^{13}$, depending from the car, the opposite arm of the T-lever being pivotally connected by a link, $B^{14}$, to a reciprocating bar, $B^{15}$, mounted in ways $B^{16}$, secured to the bottom of the car. To the forward end of the reciprocating bar $B^{15}$ is pivoted the inner singletree, $B^{17}$, having attached to its ends the chain traces $B^{18}$, passing through guide-staples $b$, and said traces are connected in the usual manner to the hames, represented in the drawings by the transverse bar X, the horse being represented by the longitudinally-sliding bar H. An outer singletree, $B^{19}$, mounted in a clevis, $B^{20}$, projecting from the front of the car, is connected by chains $B^{21}$ to the traces $B^{18}$, and serves to limit the forward movement of the inner singletree and its bar $B^{15}$.

To apply the brake, a link, C, having its lower end pivoted, as at C', to the inner end of the rock-arm $B^9$, straddles the axle, and to its upper end is connected a chain, $C^2$, which passes up and over a pulley, $C^3$, mounted in brackets secured to the bottom of the car, and is connected to a sliding bar, D, held in place by suitable metal straps, D'. Said bar has upon one side, adjacent to its forward end, teeth or notches $D^2$, with which a spring-pressed pawl, $D^3$, is adapted to come into engagement, in a manner hereinafter described.

Rigidly secured to the bar $B^{15}$, and projecting from each side thereof, is an arm, E, which is connected by a link, E', to an oscillating lever, F, pivoted at F' to the under side of the car. The beveled end of the arm E, extending in line with the tail end of the pawl, is thus adapted to strike it and release the pawl $D^3$ from engagement with the notch $D^2$ when said arm has reached forward to a certain point. The opposite end of the lever F is connected by a chain, $F^2$, to a lug, $D^4$, on the inner end of the sliding bar D, and also to a rod, G, leading to a chain adapted to be wound upon a drum by the usual brake-crank, $G'$.

To prevent any strain upon the car-starting mechanism, in case the clevis $B^{20}$ or its pivot-pin should happen to break, the sliding bar $D^{15}$, or its arm $E^3$, is provided with a lug, $e$, Fig. 4, to abut against a lug, $b^2$, projecting from the guideway $B^{16}$, when said bar $B^{15}$ has reached the forward end of its course.

To apply the brake, the crank-rod G is turned as far as possible and the horse brought to a standstill, the crank being held in that position by the usually-employed pawl and ratchet mechanism.

In winding the chain $G^2$ about the drum $G'$ the rod G draws upon and swings that end of the pivoted lever F to which it is attached toward the front. This in turn, and by means of the chain $F^2$, draws the bar D toward the front, and said bar, drawing upon the chain $C^2$ and link C, causes the inner end of the rock-arm $B^8$ $B^9$ to be drawn upwardly, and as they are rigidly attached to the rock-shafts $B'$, their arms $B^6$ swing inwardly and firmly press the brake-shoes $B^7$ against the peripheries of the wheels. By swinging one end of the lever F to the front the opposite end is thrown to the rear, and by means of the link $E'$ pivoted thereto it causes the reciprocating bar $B^{15}$ to be drawn toward the rear, which motion draws the horse back nearer to the car. With this backward movement of the bar $B^{15}$ the T-lever $B^{12}$ is swung to the rear, and by means of the link $B^{11}$ it pulls the outer end of the rock-arm $B^9$ upward toward the body of the car, and as its opposite end is retained immovable by the link C the front end of the brake-frame B becomes tilted up, as shown in Fig. 3, and the wheels are locked.

To start the car, the crank is released by the driver and the horse started. As he advances the draft operates, first, upon the singletree $B^{17}$, which moves forward therewith the sliding bar $B^{15}$, and as said bar moves forward the upper arms of the T-lever $B^{12}$ its link $B^{11}$ depresses the front end of the rock-arm $B'$, and causes a reversal of the operation before described. This of course forces the frame to its normal or horizontal position, and as the brake-shoes are still locked against the wheels and must turn with the frame the wheels are consequently rotated a short distance forward. Now, by the time the frame has reached its normal horizontal position and the wheels have advanced as far as permissible, the beveled end of the arm F is brought in contact with the tail of the pawl $D^3$, which releases said pawl from engagement with the teeth $D^2$ of the bar D, and this bar, being under tension by the weight of the link C and rock-arms $B^9$ $B^{10}$, is drawn to the rear, slackening the chain $C^2$, allowing the link and levers to become depressed, which action tips the rock-shafts $B'$ and withdraws the braking-shoes from the wheels, by which time the bar $B^{15}$ has reached the limit of its forward movement and the draft is brought upon the car.

Having now fully described my invention and its operation, I claim—

1. In a car-starter, the combination of the draft-wheels and brake-shoes bearing against two opposite points of the tire of said wheels, a brake-frame mounted upon the axle of said wheels, and devices for applying the brake-shoes and tilting the brake-frame, substantially as described.

2. In a car-starter, a brake-frame provided with brakes having brake-shoes bearing against two opposite points of the tire of the wheels and mounted upon the axle of said car, in combination with devices for independently applying the brakes and tilting the brake-frame, substantially as described.

3. The combination of car-wheels and the axles thereof, with a brake-frame journaled thereon, and sheave-plates having anti-friction rollers mounted thereon and bearing on the axle, substantially as described.

4. The combination of car-wheels and their axle, a brake-frame pivoted upon said axle, and provided with rock-shafts at each end carrying brake-shoes and having inwardly-disposed rock-arms secured thereto, with a link uniting them and a chain leading to the brake-producing mechanism, substantially as described.

5. In a car-starter, the combination of a brake-frame journaled on the axle and provided with rock-shafts carrying brakes and with rock-arms pivotally connected to each other, with a sliding bar pivotally connected to one of said arms, a sliding ratchet-bar, and a spring-pressed pawl adapted to be released from engagement with said ratchet-bar by the sliding bar while moving forward, as described.

6. A combined brake and starter for cars, comprising a rocking frame mounted on the car-axle and adapted to oscillate, and provided with rock-shafts at each end, brake-shoes bearing against two opposite points of the tire of the wheels, and mechanism, substantially as described, whereby the application of the brake tilts the brake-frame, and the release of the brake and the application of the draft first starts the car and returns the frame to its normal position and then releases the brake-shoes from the wheels, substantially as described.

7. In a car-starter, the combination of a frame pivotally mounted upon the axle, brakes mounted on said frame, brake-shoes bearing against two opposite points of the tire of the wheels, and devices, substantially as described, for tilting the frame when applying the brakes, and returning the same to its normal position, and rotating the wheels before releasing said brakes, substantially as specified.

8. The combination of the axle $A^3$, the brakeframes B, having rock-shafts B', the arms $B^8$ $B^9$, the sliding bar $B^{15}$, the arm E, secured thereon and extending toward a spring-pawl, the bar E', lever F, ratchet-bar D, and pawl $D^3$, substantially as and for the purpose specified.

9. The combination of the sliding bar $B^{15}$, the brake-frame B, and its connections therewith, the singletree $B^{17}$, traces $B^{18}$, and the singletree $B^{20}$, connecting with said traces, substantially as and for the purpose set forth.

In testimony whereof I affix my signature in presence of two witnesses.

GILES T. JOBSON.

Witnesses:
WM. C. GIBSON,
HENRY C. GOODRICH.